United States Patent

Horst

Patent Number: 5,770,910
Date of Patent: Jun. 23, 1998

[54] SWITCHED RELUCTANCE MOTOR STATOR ASSEMBLY

[75] Inventor: Gary E. Horst, Manchester, Mo.

[73] Assignee: Emerson Electric Co., St. Louis, Mo.

[21] Appl. No.: 175,562

[22] Filed: Dec. 30, 1993

[51] Int. Cl.$^6$ .................................................... H02K 3/48
[52] U.S. Cl. ........................................... 310/214; 310/215
[58] Field of Search ................................... 310/214, 179, 310/180, 215

[56] References Cited

U.S. PATENT DOCUMENTS

| | | | |
|---|---|---|---|
| 747,698 | 12/1903 | Geisenhoner | 310/214 |
| 1,279,810 | 9/1918 | Williamson | 310/214 |
| 3,866,070 | 2/1975 | Madsen | 310/214 |
| 4,037,312 | 7/1977 | Deis | 29/598 |
| 4,147,946 | 4/1979 | Linscott, Jr. et al. | 310/214 |
| 4,427,910 | 1/1984 | Richter et al. | 310/214 |
| 4,761,580 | 8/1988 | Hein et al. | 310/214 |
| 4,973,871 | 11/1990 | Bisantz | 310/154 |
| 5,124,607 | 6/1992 | Rieber et al. | 310/214 |
| 5,343,105 | 8/1994 | Sawabe et al. | 310/179 |
| 5,598,049 | 1/1997 | Meier | 310/214 |

Primary Examiner—Steven L. Stephan
Assistant Examiner—Michael J. Wallace, Jr.
Attorney, Agent, or Firm—Polster. Lieder, Woodruff & Lucchesi

[57] ABSTRACT

An improved switched reluctance motor (1) has a stator assembly (3) and a rotor assembly (5) mounted for rotation relative to the stator assembly. A stator (9) has a plurality of stator teeth (11) defining stator slots (17) therebetween. Stator winding sets (19, 21) include coils inserted in the slots in concatenated pattern in which one part of a coil is inserted in one stator slot and another part of the coil is inserted in the adjacent stator slot. The part of one coil (19a) inserted in a slot is positioned adjacent an inner end of the slot, and a part of a coil (21a) of the second winding set is inserted in the slot toward the outer end of the slot. A wedge (25) is inserted in each slot after the concatenated sets of windings are installed therein. Each wedge is sized to fit in the outer end of a slot and extends the length of the slot. The wedge has a curved outer surface (27) which generally corresponds to the curvature of the end of the teeth adjacent the rotor assembly. An inner surface (33) of each wedge is generally flat and bears against the portion of the coil (21a) located adjacent the outer end of a slot. The wedge compresses the coils sets into the slot. Insertion of wedges in the slots both increases the fill factor of the stator and reduces motor noise caused by movement of the stator windings.

11 Claims, 2 Drawing Sheets

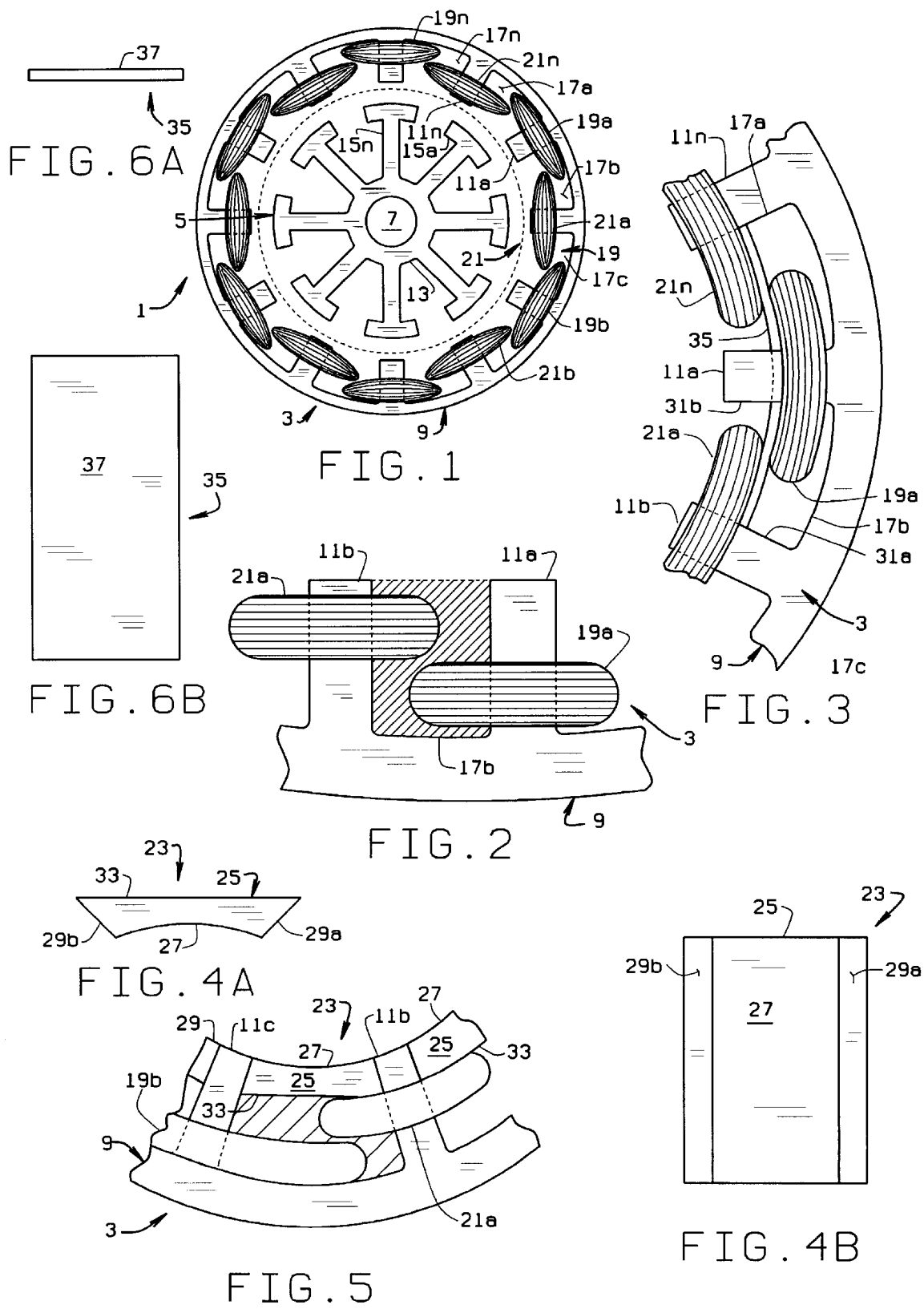

SWITCHED RELUCTANCE MOTOR STATOR ASSEMBLY

BACKGROUND OF THE INVENTION

This invention relates to switched reluctance motors (SRM's) and, more particularly, to an improved concentrated coil switched reluctance motor in which the "siren" effect produced by the concentration of coils is reduced, and stator slot fill factors are improved.

In concentrated coil switched reluctance motors, concentrically wound stator coils are installed in the stator slots so there is a one-tooth overlap of coils. The resulting dual saliency of the stator poles creates certain problems. A first of these is fill factor. Fill factor is the measure of the available volume within each stator slot that is actually filled by stator coil windings. In current concentrated coil SRM's, this factor is approximately 30%–40% This means that more than one-half the available volume is unused or wasted; and as such, effectively increases the cost of the of the motor.

The second problem is what is referred to as the "siren" effect. This is a high-pitched squeal caused by the two sets of salient poles passing each other at high frequency. This effect adds to the noiseiness of the motor when it is running.

SUMMARY OF THE INVENTION

Among the several objects of the present invention may be noted the provision of an improved SRM; the provision of such an improved SRM which is a concentrated coil SRM having a one-tooth overlap winding scheme; the provision of such an improved SRM in which the percentage of fill created as a result of using concentrated coils is significantly increased; the provision of such an improved SRM in which the fill percentage is increased by compacting the overlapping coil arrangement; the provision of such an impoved SRM in which fill volume is improvable by approximately 20%; the provision of such an improved SRM in which the overlapping coils within a stator slot are effectively insulated from each other; the provision of such an improved SRM in which the stator slot can be reduced in size to produce a more compact coil arrangement which helps reduce the coil movement otherwise created by the low slot fill of non-overlapping coils; and, the provision of such an SRM which is a quiet, cost effective motor.

In accordance with the invention, generally stated, an improved switched reluctance motor has a stator assembly and rotor assembly including a rotor shaft on which the rotor assembly is mounted for rotation relative to the stator assembly. The stator assembly includes a stator having a plurality of stator teeth defining stator slots therebetween. A plurality of stator winding sets each include stator coils inserted in the slots. Each set of stator windings overlaps one of the stator teeth to provide a concatenated pattern in which one part of a winding coil is inserted in one stator slot and another part of the coil is inserted in the adjacent stator slot. Further, the part of one coil inserted in a slot is positioned adjacent an inner end of said slot, and a part of the second coil set inserted in the slot is positioned toward the outer end of said slot. A wedge is inserted in each stator slot after the concatenated sets of windings are installed therein. Each wedge is sized to fit in the outer end of each slot and extends the length of the slot. The wedge has a curved outer surface the curvature of which generally corresponds to the curvature of the end of the teeth adjacent the rotor assembly so to present a generally uniform outer surface to the rotor assembly. This reduces siren noise by eliminating the double saliency. The inner surface of each wedge is generally flat and bears against the portion of the coil located adjacent the outer end of a slot thereby to compress the winding coils into the slot. Insertion of wedges in the slots therefore both increases the fill factor of the stator and reduces motor noise caused by the concatenation of the stator windings. A method of manufacturing an improved stator assembly having concatenated sets of windings is also disclosed. Other objects and features will be in part apparent and in part pointed out hereinafter.

BRIEF DESCRIPTION OF THE DRAWINGS

FIG. 1 is a representation of a switched reluctance motor having concatenated stator winding sets;

FIG. 2 is a partial view of a stator slot with coils installed therein to illustrate the fill factor of the slot;

FIG. 3 is a view similar to FIG. 2 but with an insulator inserted in the slot between the coils inserted therein;

FIG. 4A is a top plan view of a wedge for insertion into a slot after the coils are inserted therein;

FIG. 4B is an elevational view of the wedge;

FIG. 5 is an installed view of the wedge in the slot; and,

FIGS. 6A and 6B are respective end plan and elevational views of an insulation strip installed in a slot, as shown in FIG. 3, to insulate one coil from another; and, FIGS. 7A and 7B represent prior art concatenated coil installation.

Corresponding reference characters indicate corresponding parts throughout the drawings.

DESCRIPTION OF A PREFERRED EMBODIMENT

Figure 7A:
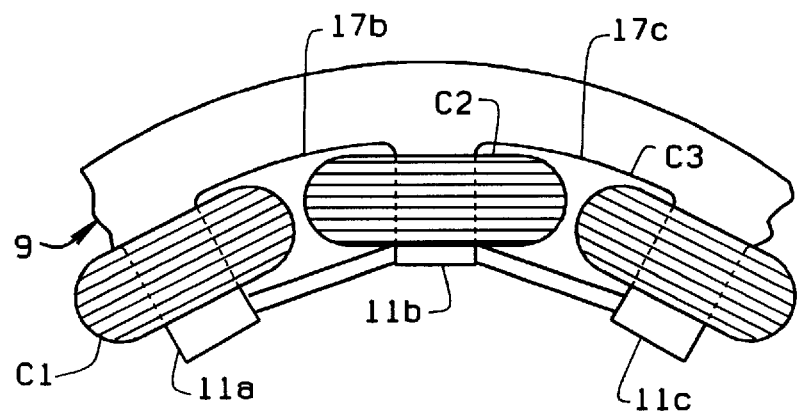

Referring to the drawings, an improved concentrated coil switched reluctance motor (SRM) of the present invention is indicated generally 1 in FIG. 1. Motor 1 has a stator assembly 3 and a rotor assembly 5 including a rotor shaft 7 on which the rotor assembly is mounted for rotation relative to the stator assembly. Stator assembly 3 includes a stator 9 having a plurality of stator teeth 11a–11n. Rotor assembly 5 includes a rotor 13 having a plurality of rotor teeth 15a–15n. The actual number of stator and rotor teeth is a function of the type of SRM motor 1 is. The motor can be either a single-phase or polyphase motor having a defined ratio of stator poles to rotor poles. The resulting number of such stator teeth is therefore not germane to the scope of the invention. Regardless of the number of stator teeth, the teeth define respective stator slots 17a–17n therebetween.

In manufacturing the stator assembly, respective first and second sets of stator windings 19, 21 respectively are inserted in the stator slots 17. Set 19 of stator windings includes coils 19a–19n which are installed in the stator before the coils 21a–21n of winding set 21. Each stator coil, when inserted in the stator, surrounds one of the stator teeth. Thus, winding coil 19a is shown in FIGS. 1–3 to surround stator tooth 11a. As a result, one portion of the coil is inserted in slot 17a, and another portion in slot 17b. It will be seen in the Figs., that the winding coils comprising set 19 are installed in the slots 17 so to be positioned adjacent the inner end of the slots.

After the windings set 19 are inserted in the stator slots, the winding coils of set 21 are installed in the slots. These coils are also installed so to surround one stator tooth. However, these coils are offset with respect to the coils of set 19. Consequently, coil 21a has one portion installed in slot 17b along with one portion of coil 19a, and another portion in slot 17c along with one portion of coil 19b. As best shown in FIG. 1, the result is a concatenated stator winding scheme for the stator.

Figure 7B:
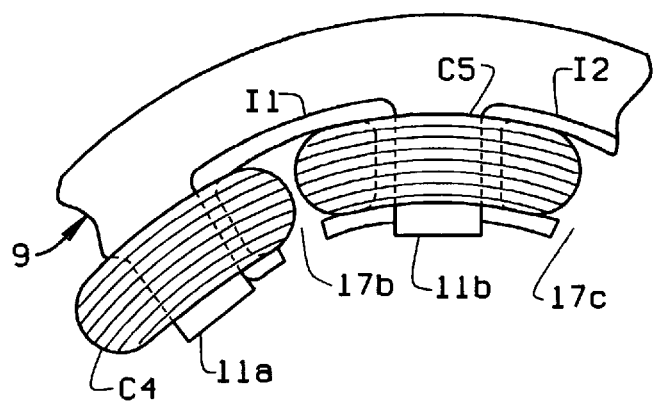

Referring to FIG. 2, one element of consideration in stator assembly manufacture is fill factor. In FIG. 2, the area of slot 17b is indicated by the dashed line. The volume of the is determined by this area times the length of the slot. With coils 19a, 21a inserted in the slot, the unfilled portion of the slot is represented by the shaded area. As shown, the fill factor of the slots of stator 9 can be greater than 50%. FIGS. 7A and 7B illustrate prior art coil winding schemes. In FIG. 7A, a single coil C1 surrounds tooth 11a, a coil C2 tooth 11b, a coil C3 tooth 11c, etc. These coils are preformed coils and the fill factor of slots 7B, 17c is for example, 30%–40%. In FIG. 17b, preformed molded insulation inserts I1, I2 are respectively installed in slots 17b, 17c. Coils C4 and C5 are then formed to surround the respective stator teeth 11a, 11b. There coils are wound using a gum winder or needle winder as is known in the art. The slot fill factor of this arrangement is again on the order of 30%–40% It is an advantage of the concatenated winding scheme of the present invention to not only increase slot fill factor, but to also obviate any noise caused by the "siren" effect caused by the double saliency of the motor.

The present invention includes means 23 which are insertable in each stator slot after the concatenated sets of windings are installed therein. In FIGS. 4A and 4B, means 23 is shown to be a wedge shaped insert 25. As shown in FIG. 4B, wedge 25 comprises an elongate strip the length of which corresponds to the length of the slot. Further, each wedge has a curved outer surface 27 the curvature of which generally corresponds to the curvature of the end of the teeth adjacent rotor assembly 5. As such, insertion of the wedges 25 in the slots 17 smooths the inner contour of the stator and presents a generally uniform stator surface to the rotor assembly. This effectively removes the double saliency of the motor and reduces the "siren"0 effect. In addition to its curved outer surface, the wedge has inwardly angled sidewalls 29a, 29b which are angled at the same angle as the sidewalls 31a, 31b of the slots. When the wedge is inserted in the slots, it is locked in place by the sidewalls of the slot and cannot be dislodged. The wedge has a flat inner surface 33 which extends from one slot sidewall to the other when the wedge is in place. This flat surface of the wedge bears against the windings of the coil inserted toward the outer end of the slot, pressing inwardly toward the windings of the other coil installed in the slot.

Installation of a wedge 25 in a slot 17 does a number of things: First, it takes up a portion of the unused volume in the slot. As such, it helps increase the fill factor of the slot by reducing the ratio of slot volume in which the coils reside to total slot volume. This can be seen in FIG. 5 where the wedges are shown inserted in the outer end of the slots. Again, the unfilled portion of the slot is represented by the shaded area in FIG. 5. Typically, insertion of a wedge in the slot compresses the coil so their is less coil movement in the slot.

Next, as shown in FIG. 3, it may be desirable to electrically insulate one coil inserted in a slot from the other. For this purpose, an insulation means 35 is inserted between the portion of each coil inserted in the slot. Insulation means 35 includes an elongate strip 37 of electrical insulation material which is inserted between the coils. Strip 37, like wedge 25 extends the length of the slot in which it is installed. The strip is flat strip which is readily bent for insertion in a slot so to extend from one sidewall of the slot to the other.

What has been described is an improved SRM which is a concentrated coil SRM having two sets of coils each of which are installed in the stator with a one-tooth span. The fill volume of the stator slots, as a result of using concentrated coils, is significantly reduced by compacting the overlapping coils after their installation. This is accomplished using a wedge installed in the slot at the outer end of the slot. Further, the overlapping coils within a stator slot are effectively insulated from each other. Provision of the wedge also serves to cover the outer end of the slots. By using the wedge to compact the coils, the siren noise otherwise created by the double saliency is reduced. The result is an SRM which is a quiet, cost effective motor.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. In a switched reluctance motor having a stator assembly and a rotor assembly including a rotor shaft on which the rotor assembly is mounted for rotation relative to the stator assembly, the stator assembly including a stator having a plurality of stator teeth defining stator slots therebetween with a plurality of concatenated stator winding sets inserted in the slots, each set of stator windings including coils which surround one of the stator teeth whereby one part of a coil is installed in one stator slot and another part of the coil is inserted in the adjacent stator slot, a part of a first winding set coil inserted in a slot being positioned adjacent an inner end of said slot and a part of a second winding set coil inserted in said slot being positioned toward an outer end of said slot, the improvement comprising means inserted in the stator slots after the stator winding sets are inserted therein to increase a fill factor of the stator and reduce noise caused by the concatenation of the coils, said means comprising a wedge insertable in each stator slot after coils are installed therein, each wedge being sized to fit in an open end of each stator slot and extend across the slot, each wedge having a curved outer surface the curvature of which generally corresponds to the curvature of the surface of said stator at the outer end of the stator teeth adjacent the rotor assembly so to present a generally smooth surface to the rotor assembly, respective sidewalls of said slots being generally straight and the width of said slots being tapered so to increase from the open end of the slot to a closed end thereof, and sidewalls of each wedge being generally straight sidewalls matingly tapered with the sidewalls of a slot for the wedge to fit in the open end of the slot, and an inner surface of each wedge being generally flat and bearing against the portion of a coil located adjacent the outer end of a slot thereby to compress said coil into the slot, installation of the wedge reducing the volume of the slot available to be filled by the coils thereby effectively compressing the coils into the slot.

2. The improvement of claim 1 further including insulation means inserted between the portion of each coil inserted in the slot to electrically isolate the coils.

3. The improvement of claim 2 wherein the insulation means includes an elongate strip of electrical insulation material inserted in the slot between the windings.

4. The improvement of claim 1 wherein the length of the wedge corresponds to the length of a slot in which it is fitted.

5. A switched reluctance motor comprising:

a stator assembly including a stator having a plurality of stator teeth defining stator slots therebetween;

a rotor assembly including a rotor shaft on which the rotor assembly is mounted for rotation relative to the stator assembly;

a plurality of stator winding sets including coils inserted in said stator slots with coils of one winding set being inserted in adjacent slots so to span one of the stator teeth, said coils being positioned in the slots so to be adjacent an inner end of each slot, and coils of a second winding set also being inserted in adjacent slots so to span one of the stator teeth, and coils of the first winding set being offset with respect to those of the second winding set whereby said first and second winding sets form concatenated sets of windings, the coils of the second winding set being positioned in the slots so to be adjacent the outer end of the slots; and, a wedge insertable in each open end of each stator slot after the concatenated sets of windings are installed therein to cover the outer end of the slot and fill an unused portion of the slot, insertion of said wedge compressing the coils in the slot so to both increase the fill factor of the stator slot and reduce a siren noise effect by smoothing out the saliency of the stator, each wedge being sized to fit in the outer end of each stator slot and extend the length of the slot, each wedge further having a curved outer surface the curvature of which generally corresponds to the curvature of the stator surface at the end of the teeth adjacent the rotor assembly so to present a generally uniform stator surface to the rotor assembly, an inner surface of each wedge being generally flat and bearing against the portion of the coil located adjacent the outer end of a slot thereby to compress said coils into the slot, and respective sidewalls of each said slot being generally straight with the width of said slots being tapered so to increase from the open end of the slot to a closed end thereof, and sidewalls of each wedge being straight sidewalls matingly tapered with the slot sidewalls for a wedge to fit in the open end of a slot.

6. The motor of claim 4 further including insulation means inserted between the portion of each coil inserted in a slot.

7. The motor of claim 5 wherein the insulation means includes an elongate strip of electrical insulation material inserted in the slot between the coils.

8. A switched reluctance motor comprising:

a stator assembly including a stator having a plurality of stator teeth defining stator slots therebetween;

a rotor assembly including a rotor shaft on which the rotor assembly is mounted for rotation relative to the stator assembly; and a plurality of stator winding sets including coils inserted in said stator slots with coils of one winding set being inserted in adjacent slots so to span one of the stator teeth, said coils being positioned in the slots so to be adjacent an inner end of each slot, and coils of a second winding set also being inserted in adjacent slots so to span one of the stator teeth, the coils of the second windings set being positioned in the slots so to be adjacent the open end of the slots, and the coils of the first winding set being offset with respect to those of the second winding set whereby said first and second winding sets form overlapping top-bottom concatenated sets of windings, increasing the fill factor of the stator slots.

9. The switched reluctance motor of claim 8 wherein insulation means is inserted between the overlapping top-bottom portions of each coil inserted in the slots, the insulation means electrically isolating the coils of first winding from the coils of the second winding.

10. The switched reluctance motor of claim 9 wherein the insulation means includes an elongate strip of electrical insulation material, the strip extending across the width of the slot, and the length of the strip corresponding to the length of the slot.

11. The switched reluctance motor of claim 8 further including a wedge insertable in the open end of each stator slot after the overlapping top-bottom concatenated set of windings are installed therein to cover the open end of the slot and fill an unused portion of the slot, insertion of said wedge compressing the coils of the first and second windings towards the inner end of the slot so to increase the fill factor of the slot and reduce the siren noise effect by smoothing out the saliency of the stator, each wedge being sized to fit in the open end of a slot and to extend the length of the slot, each wedge further having a curved outer surface the curvature of which generally corresponds to the curvature of the stator surface at the end of the teeth, adjacent the rotor assembly, so to present a generally uniform stator surface to the rotor assembly, and inner surface of each wedge being generally flat and bearing against the portion of the second winding coil originally located adjacent the open end of the slot thereby to compress the coils of the first and second windings into the slot, and the respective sidewalls of each slot being generally straight and tapered so to increase from the open end of the slot to the inner end thereof, and sidewalls of each wedge being straight and matingly tapered with the slot sidewalls for the wedge to fit in the open end of the slot.

* * * * *